(12) United States Patent
Son

(10) Patent No.: US 6,233,635 B1
(45) Date of Patent: May 15, 2001

(54) DIAGNOSTIC/CONTROL SYSTEM USING A MULTI-LEVEL I2C BUS

(75) Inventor: Ho-kyu Son, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/114,306

(22) Filed: Jul. 10, 1998

(30) Foreign Application Priority Data

Oct. 7, 1997 (KR) .................................................. 97-32148

(51) Int. Cl.[7] .............................................. G06F 13/00
(52) U.S. Cl. .......................... 710/126; 710/128; 710/129; 710/131
(58) Field of Search .................................... 710/126, 128, 710/129, 131, 101

(56) References Cited

U.S. PATENT DOCUMENTS

| 4,610,013 | 9/1986 | Long et al. . |
| 4,825,438 | 4/1989 | Bennett et al. . |
| 5,376,928 | 12/1994 | Testin . |
| 5,448,703 | * 9/1995 | Amini et al. ............................ 710/10 |
| 5,522,050 | 5/1996 | Mini et al. . |
| 5,555,372 | 9/1996 | Tetreault et al. . |
| 5,598,538 | * 1/1997 | Cooper ................................. 710/101 |
| 5,604,918 | * 2/1997 | Huijsing et al. ........................ 710/72 |
| 5,627,965 | 5/1997 | Lindell et al. . |
| 5,682,484 | * 10/1997 | Lambrecht ............................ 710/128 |
| 5,754,807 | 5/1998 | Lambrecht et al. . |

FOREIGN PATENT DOCUMENTS

11096090 * 4/1999 (JP) .

* cited by examiner

Primary Examiner—Ario Etienne
(74) Attorney, Agent, or Firm—Robert E. Bushnell, Esq.

(57) ABSTRACT

A diagnostic/control system using a multi-level I2C bus, includes: multiple I2C bus master devices (MD0 to MDn) connected to a primary I2C bus; a I2C bus multiplexer module, which separates multiple secondary I2C buses from said primary I2C bus, and which connects as many I2C bus slave devices (SD00 to SD0N, SD10 to SD1N, . . . , SDN1 to SDNN) are needed on said secondary I2C bus; and I2C bus slave devices (SD00 to SD0N, SD10 to SD1N, SDN1 to SDNN) connected to said secondary I2C bus. The I2C bus multiplexer module provides access at any instant between any I2C bus master device (MD0 to MDn) and any I2C bus slave device on the secondary I2C bus.

41 Claims, 7 Drawing Sheets

DIAGNOSTIC/CONTROL SYSTEM USING A MULTI-LEVEL I2C BUS

CLAIM OF PRIORITY

This application makes reference to, incorporates the same herein, and claims all benefits accruing under 35 U.S.C. §119 from an application for A DIAGNOSTIC/CONTROL SYSTEM USING A MULTI-LEVEL I2C BUS earlier filed in the Korean Industrial Property Office on the $10^{th}$ of July 1997 and there duly assigned Ser. No. 32148/1997.

BACKGROUND OF THE INVENTION

1. Technical Field

The present invention relates to a diagnostic/control system using a multi-level I2C bus. More specifically, the invention relates to a diagnostic/control system using a multi-level I2C bus which embodies the I2C bus in a multi I2C bus structure using a multiplexer, and which makes system diagnosis/control possible by virtue of connecting the I2C devices needed in system diagnosis with a I2C bus, irrespective of the number of device, by adding a control circuit.

2. Related Art

It is known in the art to connect a plurality of I2C bus master devices via a I2C bus to a plurality of other I2C bus master devices. It is also known in the art to connect a single bus master device via a I2C bus to a plurality of I2C bus slave devices. Finally, it is known in the art to connect a plurality of I2C bus master devices via a I2C bus to a plurality of I2C bus slave devices.

The latter arrangements enable the diagnosis/control of appropriate modules in each module of mini or large scale computers, and each bus master device is connected via bus cables. In this manner, an agent can manage an overall system.

However, a significant drawback of the prior arrangements resides in the fact that, in such arrangements, the number of bus devices which can be interconnected is limited. That is to say, there is a limitation as to the number of bus slave devices which can be connected in order to perform a system diagnosis/control function.

Therefore, there is a need for the development of a diagnostic/control system using a multi-level I2C bus in which the number of I2C bus devices which can be connected is not limited. There is also a need for the development of a diagnostic/control system using a multi-level I2C bus in which the diagnosis/control function of the system is not limited by any limitation on the number of I2C bus slave devices.

The following patents are considered to be representative of the prior art, and are burdened by the disadvantages set forth herein: U.S. Pat. No. 5,754,807 to Lambrecht et al., entitled Computer System Including A Multimedia Bus Which Utilizes A Separate Local Expansion Bus For Addressing And Control Cycles, U.S. Pat. No. 5,682,484 to Lambrecht, entitled System And Method For Transferring Data Streams Simultaneously On Multiple Buses In A Computer System, U.S. Pat. No. 5,627,965, entitled Method And Apparatus For Reducing The Effects Of Hardware Faults In A Computer System Employing Multiple Central Processing Modules, U.S. Pat. No. 5,604,918 to Hijsing et al., entitled Two-Line Mixed Analog/Digital Bus System And A Master Station And A Slave Station For Use In Such System, U.S. Pat. No. 5,598,538 to Cooper, entitled SCSI Multiplexer For Coupling A Computer Local Bus To A Shared Peripheral Global Bus, U.S. Pat. No. 5,555,372 to Tetreault et al, entitled Fault-Tolerant Computer System Employing AN Improved Error-Broadcast Mechanism, U.S. Pat. No. 5,522,050 to Amini et al, entitled Bus-To-Bus Bridge For A Multiple Bus Information Handling System That Optimizes Data Transfers Between A System Bus And A Peripheral Bus, U.S. Pat. No 5,448,703 to Amini et al., entitled Method And Apparatus For Providing Back-To-Back Data Transfers In AN Information Handling System Having A Multiplexed Bus, U.S. Pat. No. 5,376,928 to Testin, entitled Exchanging Data And Clock Lines On Multiple Format Data Buses, U.S. Pat. No. 4,825,438 to Bennett et al., entitled Bus Error Detection Employing Parity Verification, and U.S. Pat. No. 4,610,016 to Long et al., entitled Remote Multiplexer Terminal With Redundant Central Processor Units.

SUMMARY OF THE INVENTION

Therefore, in order to solve said problems, the object of the present invention is to provide a diagnostic/control system using a multi-level I2C bus comprising: multiple I2C bus master devices (MD0 to MDn) connected to a primary I2C bus; a I2C bus multiplexer module, which separates multiple secondary I2C buses from the primary I2C bus, and which can connect as many I2C bus slave devices (SD00 to SD0N, SD10 to SD1N, . . . , SDN1 to SDNN) as are necessary on the secondary I2C bus; I2C bus slave devices (SD00 to SD0N, SD10 to SD1N, SDN1 to SDNN) which, at any instant, can be accessed on a secondary bus by the I2C bus master devices (MD0 to MDn).

In one preferred mode, in accordance with the invention, it is preferable that a diagnostic/control system using a multi-level I2C bus includes multiple I2C bus master devices (MD0 to MDn) connected to a primary I2C bus; a I2C bus multiplexer module which separates multiple secondary I2C buses from the primary I2C bus, and which can connect with as many I2C bus slave devices (SD00 to SD0N, SD10 to SD1N, . . . , SDN1 to SDNN) as necessary on the secondary I2C bus; I2C bus slave devices (SD00 to SD0N, SD10 to SD1N, SDN1 to SDNN) which, at any instant, can be accessed on a secondary I2C bus by each of the I2C bus master devices (MD0 to MDn).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

Figure 1:
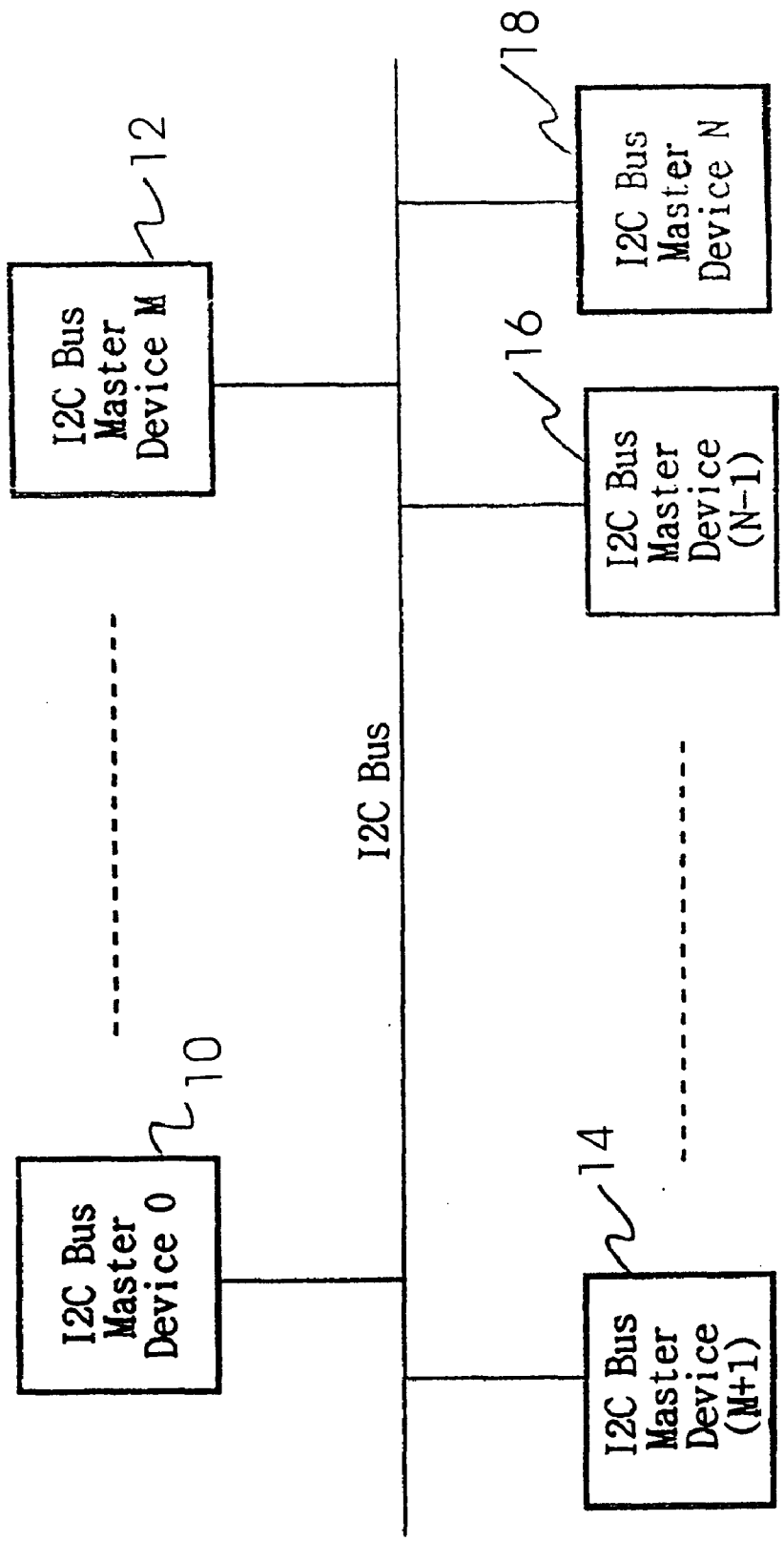
FIG. 1 illustrates a block diagram of a I2C bus structure connected only with multiple I2C master devices.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

FIG. 1 illustrates a block diagram of a I2C bus structure connected only with multiple I2C master devices. Referring to FIG. 1, the I2C bus structure is illustrated as being connected only with I2C bus master devices (MD0 to MDN) 10, . . . , 18.

The I2C bus structure contains I2C bus master devices, so as to diagnose/control the appropriate modules in each module of mini or large scaled computers, and each I2C bus master device is connected with I2C bus cables, this structure being a system by which an agent can manage an overall system.

Figure 2:
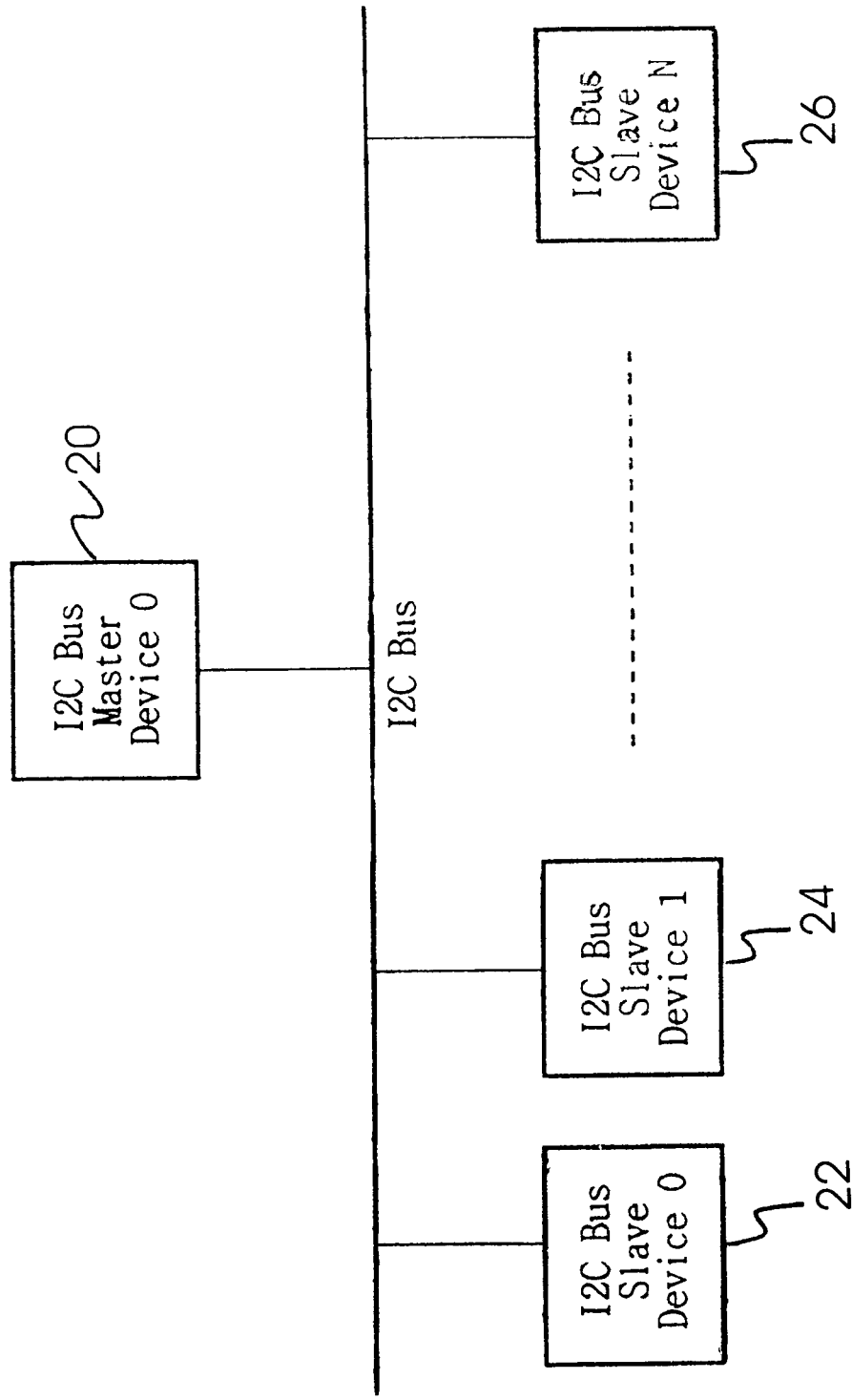
FIG. 2 illustrates a block diagram of a I2C bus structure connecting a I2C master device and multiple I2C bus slave devices.

FIG. 2 illustrates a block diagram of a I2C bus structure connected with a I2C master bus device (MD0) 20 and multiple I2C bus slave devices (SD0 to SDN) 22, 24, . . . , 26.

The I2C bus structure is a system wherein various diagnosis/control functions are offered by multiple I2C bus slave devices 22, 24, . . . , 26 in order to manage the system efficiently in the system under the server class, and the I2C bus slave device is controlled by a I2C bus master device 20. In the structure, the I2C bus master device 20 gives and takes needed information and commands by communication with a system host, as necessary, using its own program.

Figure 3:
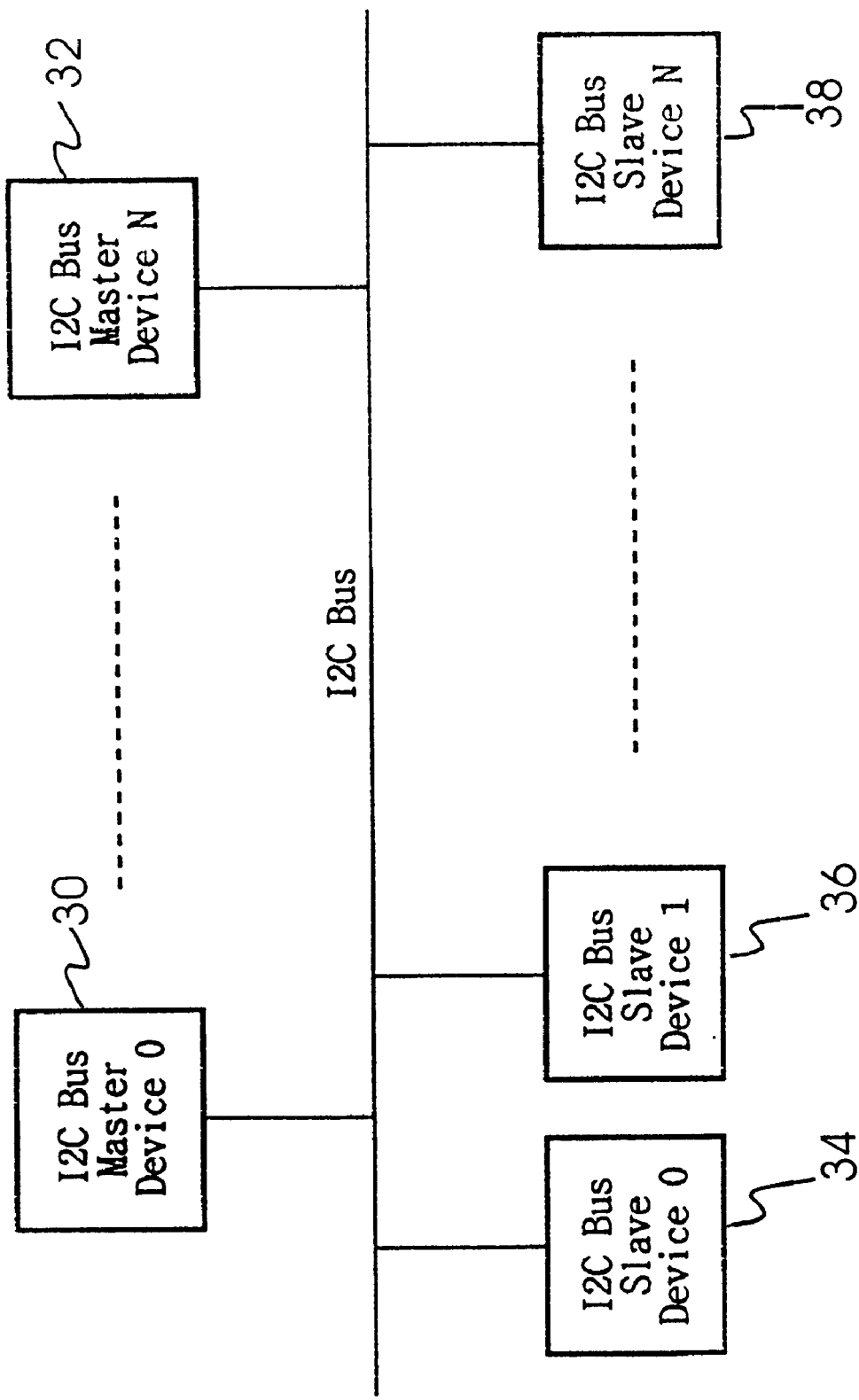
FIG. 3 illustrates a block diagram of a I2C bus structure connected to multiple I2C bus master devices and multiple I2C bus slave devices.

FIG. 3 illustrates a block diagram of a I2C bus structure wherein multiple I2C bus master devices (MD0 to MDN) 30, . . . , 32 are connected with multiple I2C bus slave devices (SD0 to SDn) 34, 36, . . . , 38. The I2C bus structure, which is a combination of the I2C bus structures of FIG. 1 and FIG. 2, is a management system to diagnose/control the system by constructing a main processor module part or a computer core part in the structure of FIG. 1 and in FIG. 2.

As noted above, it is possible for multiple I2C bus master devices 30, . . . , 32 and I2C bus slave devices 34, 36, . . . , 38 to be on the same I2C bus with the structure as shown in FIG. 3. In fact, it is possible that as many as 128 I2C bus master devices and as many as eight I2C bus slave devices can exist together on the same structure.

If the aforementioned I2C bus structure is used, however, the number of I2C bus devices which can be connected is limited. More specifically, limitation of the number of I2C bus slave devices causes limitation of the system diagnosis/control function, and makes various kinds of solutions impossible.

For example, in the case of the SDRAM DIMM module which is being produced at present, a method is provided to make it possible to manage information about the product through the I2C bus by using an EEPROM (Identification ROM) having a I2C interface, but it has problems managing only DMM. In addition, in the remote 8 bit I/O expander case, because the system structure is too complex, it is difficult to monitor the system status or to control the system. When more than eight devices are necessary, there is a restriction in such I2C bus structures. Moreover, because restriction of the number of I2C bus slave devices automatically restricts the management function, it is impossible to offer various solutions to a system user or a manager.

Figure 4:
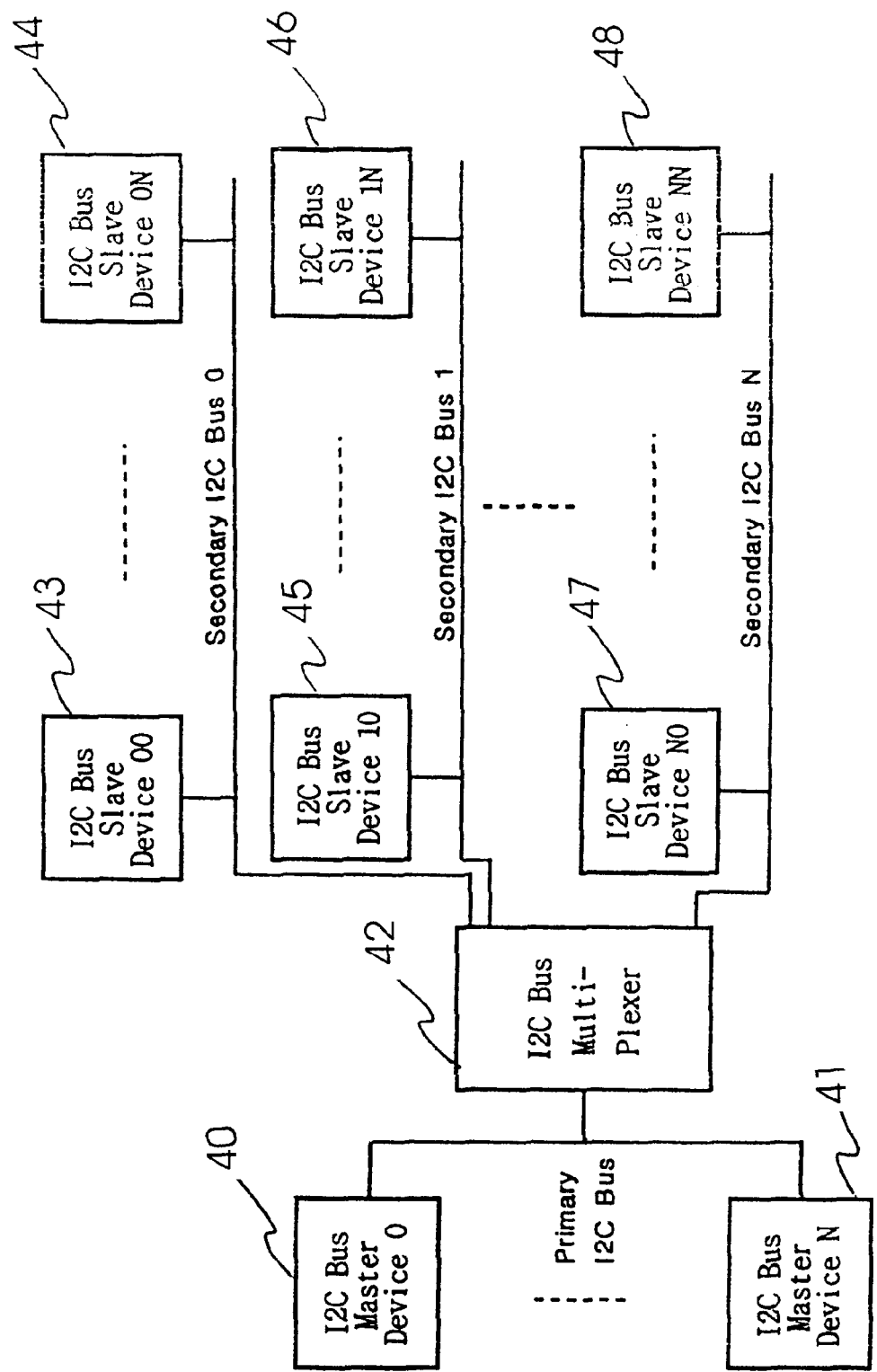
FIG. 4 illustrates a block diagram of a preferable I2C bus structure of the invention.

FIG. 4 illustrates a block diagram of a I2C bus structure of the present invention. As illustrated in FIG. 4, in order to overcome the limitation of the number of the I2C bus slave devices connected to the secondary I2C bus, the primary I2C bus is divided into multiple secondary I2C buses by using the I2C bus multiplexer 42, and multiple I2C bus slave devices (SD00, SD10, SD1N, . . . , SDN0 to SDNN) 43–48 are connected with multiple secondary I2C buses 0, 1, . . . , N.

A master device 40 (I2C bus master device 0) controlling the access of a I2C bus slave device among multiple I2C bus slave devices (SD00 to SD0N, SD10 to SD1N, . . . , SDN0 to SDNN) controls the I2C bus multiplexer 42, and the primary I2C bus connects to only one secondary I2C bus at any one moment.

Therefore, the master device 40 sets the I2C bus multiplexer 42 as a desirous secondary I2C bus before accessing the I2C bus slave device lying on one of said secondary I2C buses, and then accesses the corresponding I2C bus slave device.

Figure 5:
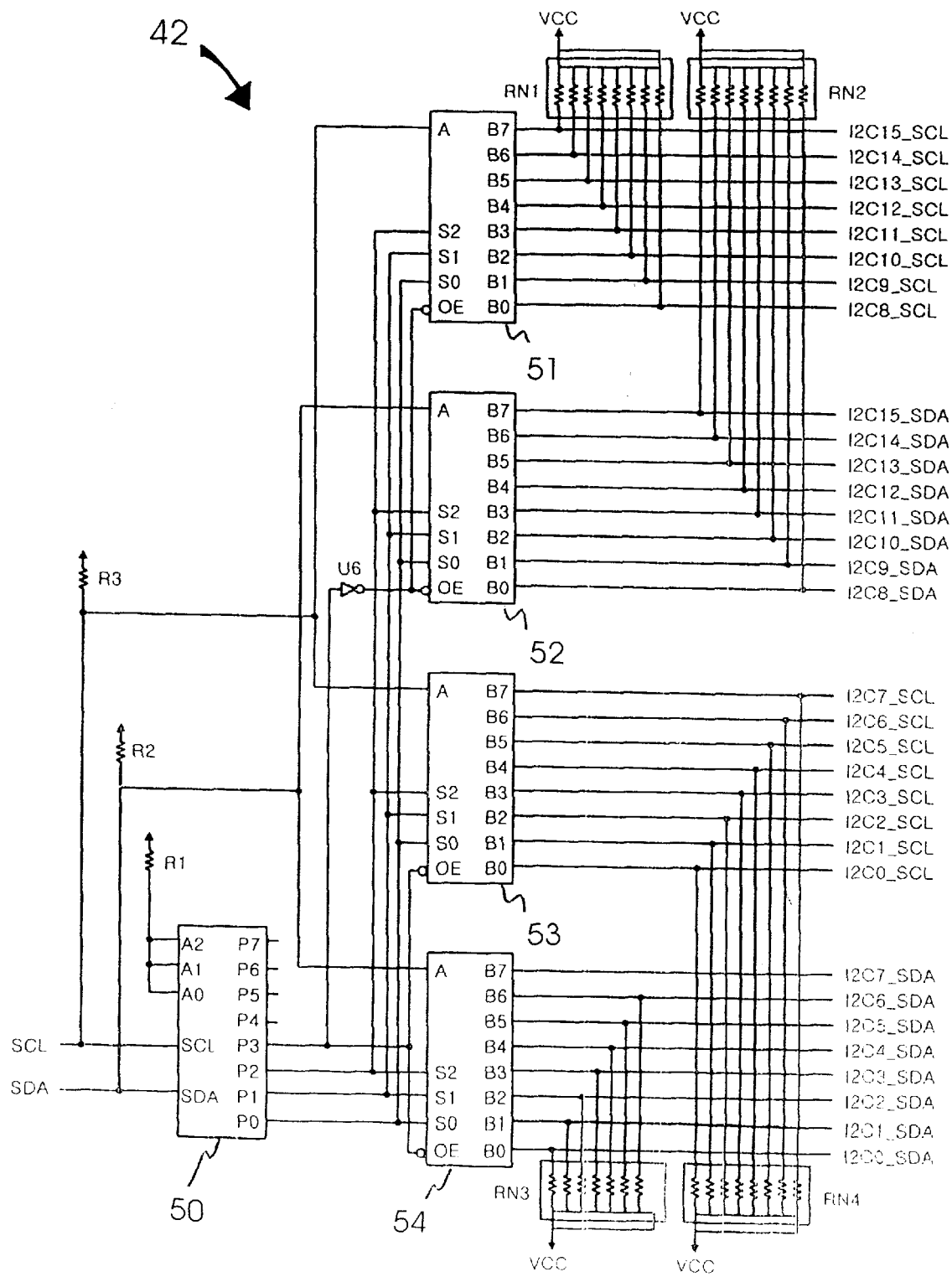
FIG. 5 illustrates a detailed circuit diagram of a I2C bus multiplexer of FIG. 4.

FIG. 5 illustrates a detailed circuit diagram of the I2C bus multiplexer of FIG. 4. As illustrated, it is composed of a remote 8 bit I/O expander 50 connected to a primary I2C bus, converting the serial data of the I2C bus into parallel data; a register R1 determining a I2C bus slave device address of the remote 8 bit I/O expander 50; 8 bit multiplexer quick switches 51–54 multiplexing an SCL signal and an SDA signal of the primary I2C bus into 8 secondary I2C buses, respectively, by using 3 bits (P2, P1, P0) in the output of the remote 8 bit I/O expander 50 as a select input signal and by using a bit (P3) among the output of registers R2, R3 sourcing current via the primary I2C bus and the remote 8 bit I/O expander 50 as an output enable signal; an inverter 55 driving the output enable signal of the 8 bit multiplexer quick switches 51, 52 by virtue of inverting a bit of outputs of the remote 8 bit I/O expander 50, in order to distinguish an upper block (I2C15_xxx to I2C8_xxx) from a lower block (I2C7-xxx to I2C0_xxx) of the secondary I2C bus; and a pull-up resistive network RN1 to RN4 which transmits high current toward each 16 secondary I2C bus.

In the present invention, it is preferable that the I2C bus multiplexer module comprises: a remote 8 bit I/O expander 50 for the I2C bus, changing serial data of the primary I2C bus into parallel data by connecting with the primary I2C bus; a register R1 determining a I2C bus slave device address of the remote 8 bit I/O expander 50 for said I2C bus; registers R2, R3 transmitting high current to said primary I2C bus; 8 bit multiplexer quick switches 51–54 multiplexing an SCL signal and an SDA signal of said primary I2C bus into each 8 secondary I2C bus by using three bits (P2, P1, P0) of the outputs of said remote 8 bit I/O expander 50 for said I2C bus as select input signals, and by using a bit of the outputs of said remote 8 bit I/O expander 50 for said I2C bus as an output enable signal; an inverter 55 driving the output enable signal of the 8 bit multiplexer quick switches 51–54 in order to distinguish an upper block (I2C15_xxx to I2C8_xxx) from a lower block (I2C7_xxx to I2C0_xxx) of said secondary I2C bus by virtue of inverting a bit of the outputs of the remote 8 bit I/O expander 50 for the I2C bus; and a pull-up resistive network RN1 or RN4 transmitting high current toward each 16 secondary I2C bus.

It is preferable that each I2C bus master device taking charge of a I2C bus slave devices access on said secondary I2C bus, among said multiple I2C bus master devices 40, . . . , 41, communicates with the remote 8 bit I/O expander 50, sets the output ports P3 to P0 of the remote 8 bit I/O expander 50, controls the select input ports S2, S1, S0 of said 8 bit multiplexer quick switches 51–54, connects each output port of said 8 bit multiplexer quick switches 51–54 with its own input port, and communicates with the arbitrary I2C bus by enabling or disabling the output of said 8 bit multiplexer quick switches 51–54 with an OE input port value through said inverter 55 according to the output of the remote 8 bit I/O expander 50.

It is preferable that each I2C bus master device taking charge of a I2C bus slave device access on the secondary I2C bus, among said multiple I2C bus master devices 40, . . . , 41, communicates with any I2C bus slave device 43–48 on said secondary I2C bus by setting a value corresponding to the secondary I2C bus number on the output ports P3 to P0 of the remote 8 bit I/O expander 50 whenever change of any secondary I2C bus is needed.

It is preferable that said multiple secondary I2C buses generate the 32 output enable signals of said 8 bit multiplexer quick switches 51–54 using the 5 bits P7 to P3 of the output port of said remote 8 bit I/O expander 50, and that said secondary I2C bus is expanded into 256 buses at a maximum by controlling each 8 bit multiplexer quick switch 51–54, consisting of two parts multiplexing said SCL signal and SDA signal with an output enable signal.

It is preferable that the 32 output enable signals of the generated 8 bit multiplexer quick switches 51–54, are generated by the inverter 55 and expressed as Boolean expression as follows, or by a generation circuit having an equivalent function with said inverter:

!0E0=!P7 & !P6 & !P5 & !P4 & !P3;
!0E1=!P7 & !P6 &!P5 &!P4 & P3;
!0E2=!P7 &!P6 &!P5 & P4 &!P3;
!0E3=!P7 &!P6 &!P5 & P4 & P3;
!0E4=!P7 &!P6 & P5 &!P4 &!P3;
!0E5=!P7 &!P6 & P5 &!P4 & P3;
!0E6=!P7 &!P6 & P5 & P4 &!P3;
!0E7=!P7 &!P6 & P5 & P4 & P3;
!0E8=!P7 & P6 & !P5 & !P4 & !P3;
!0E9=!P7 & P6 &!P5 &!P4 & P3;
!0E10=!P7 & P6 & !P5 & P4 & !P3;
!0E11=!P7 & P6 &!P5 & P4 & P3;
!0E12=!P7 & P6 & P5 & !P4 & !P3;
!0E13=!P7 & P6 & P5 &!P4 & P3;
!0E14=!P7 & P6 & P5 & P4 &!P3;
!0E15=!P7 & P6 & P5 & P4 & P3;
!0E16=P7 & !P6 & !P5 & !P4 & !P3;
!0E17=P7 & !P6 & !P5 & !P4 & P3;
!0E18=P7 &!P6 &!P5 & P4 &!P3;
!0E19=P7 &!P6 &!P5 & P4 & P3;
!0E20=P7 &!P6 & P5 & !P4 & !P3;
!0E21=P7 &!P6 & P5 &!P4 & P3;
!0E22=P7 &!P6 & P5 & P4 &!P3;
!0E23=P7 &!P6 & P5 & P4 & P3;
!0E24=P7 & P6 &!P5 &!P4 &!P3;
!0E25=P7 & P6 &!P5 &!P4 & P3;
!0E26=P7 & P6 &!P5 & P4 &!P3;
!0E27=P7 & P6 &!P5 & P4 & P3;
!0E28=P7 & P6 & P5 &!P4 &!P3;
!0E29=P7 & P6 & P5 &!P4 & P3;
!0E30=P7 & P6 & P5 & P4 &!P3;
!0E31=P7 & P6 & P5 & P4 & P3;

In the latter regard, P is the output port of said 8 bit remote I/O expander 50 and !0E0 to !0E31 are the generated output enable signals.

The invention will now be further explained in detail, the important terms of the present invention being explained as follows:

I2C bus master devices 40–41: These devices can use a I2C bus and access other master or slave devices; they also sometimes operate as slave devices when accessed by other master devices.

I2C bus slave devices 43–48: These devices cannot use the I2C bus and are passive devices operating always according to access by a master device.

I2C bus address: This address has to communicate with a needful device by using the I2C bus address on protocol because each device connected with the I2C bus has its own address; it is possible to connect to 128 devices at a maximum on a I2C bus because the I2C address is composed of 7 bits.

I2C bus master device address: This address is distinguished using 7 bits of 8 bit registers within the device; the registers can be set up by a program.

I2C bus slave device address: 4 bits of the 7 bit address are used to distinguish device type, and the other 3 bits are used to divide devices of the same kind (i.e., on a bus, at best, 8 devices of the same kind can be connected).

I2C bus slave device type: This is denoted by 4 bits of the address; the devices are denoted as follows:
00100: Remote 8 bit I/O Expander
1001: Temperature Detector
1010: EEPROM (ID ROM or for memory)
0101: H/NV Monitor The remote 8 bit I/O expander 50 illustrated in FIG. 5 is a I2C bus slave device connected to the primary I2C bus, and is controlled by the master device 40.

The secondary I2C bus (I2C15_XXX to I2C0_XXX) operates as an independent I2C bus.

In order to communicate with the arbitrary I2C bus slave device on the arbitrary secondary I2C bus, the master device 40 communicates with said remote 8 bit I/O expander 50 of multiplexer 40, and sets the output ports P3 to P0 of expander 50 at a value suitable for a desired secondary I2C bus number.

For example, to communicate with the secondary I2C bus number 12, if remote 8 bit I/O expander output ports P3, P2, P1, P0 are set to P3, P2, P1, P0=1, 1, 0, 0, the select input ports S2, S1, S0 of said 8 bit multiplexer quick switches 51–54 become S2, S1, S0=1, 0, 0, and output port B4 of each device 51–54 is connected with each input port A.

Because the 8 bit multiplexer quick switches 51–54 have a low active output enable port, the output P3 of the remote 8 bit I/O expander 50 having a value '1' goes into the OE input port as a value '0' the inverter 55, and then enables the outputs of 8 bit multiplexer quick switches 51, 52. Moreover, the 8 bit multiplexer quick switches 53, 54 become disabled because the OE input port has a value '1'.

The SCL of the primary I2C bus is connected with I2C12_SCL, and the SDA is connected with I2C12_SDA, so that the primary I2C bus and the secondary I2C bus are connected to each other.

Finally, the master device 40 communicates with the I2C bus slave device on secondary I2C bus number 12 after setting of the secondary I2C bus connection.

The master device 40 has to set the remote 8 bit I/O expander 50 to a suitable number whenever change of the secondary I2C bus is needed.

The secondary I2C buses can be expanded to a maximum of 256 if necessary, and that makes it possible to control the I2C multiplexers. To that purpose, it generates 32 output enable signals of the I2C multiplexer switch 42 using 5 bits P7 to P3 of the output port of the remote 8 bit I/O expander 50 for the I2C bus illustrated in FIG. 5, and controls the I2C multiplexers, respectively, consisting of two pairs mixing the SCL signal and the SDA signal with an output enable signal.

Then, the inverter 55 illustrated in FIG. 5 substitutes as an output enable generation circuit in accordance with the following Boolean expression:

!0E0=!P7 &!P6 &!P5 &!P4 &!P3;
!0E1=!P7 &!P6 &!P5 &!P4 & P3;
!0E2=!P7 &!P6 &!P5 & P4 &!P3;
!0E3=!P7 &!P6 &!P5 & P4 & P3;
!0E4=!P7 &!P6 & P5 &!P4 &!P3;
!0E5=!P7 &!P6 & P5 &!P4 & P3;
!0E6=!P7 &!P6 & P5 & P4 &!P3;
!0E7=!P7 &!P6 & P5 & P4 & P3;
!0E8=!P7 & P6 & !P5 & !P4 & !P3;
!0E9=!P7 & P6 &!P5 &!P4 & P3;
!0E10=!P7 & P6 & !P5 & P4 & !P3;
!0E11=!P7 & P6 &!P5 & P4 & P3;
!0E12=!P7 & P6 & P5 & !P4 & !P3;
!0E13=!P7 & P6 & P5 &!P4 & P3;
!0E14=!P7 & P6 & P5 & P4 &!P3;
!0E15=!P7 & P6 & P5 & P4 & P3;
!0E16=P7 & !P6 & !P5 & !P4 & !P3;
!0E17=P7 &!P6 &!P5 &!P4 & P3;
!0E18=P7 &!P6 &!P5 & P4 &!P3;
!0E19=P7 &!P6 &!P5 & P4 & P3;
!0E20=P7 &!P6 & P5 &!P4 &!P3;
!0E21 P7 &!P6 & P5 &!P4 & P3;
!0E22=P7 &!P6 & P5 & P4 &!P3;
!0E23=P7 &!P6 & P5 & P4 & P3;
!0E24=P7 & P6 &!P5 & !P4 & !P3;
!0E25 P7 & P6 &!P5 &!P4 & P3;
!0E26=P7 & P6 &!P5 & P4 &!P3;
!0E27=P7 & P6 &!P5 & P4 & P3;
!0E28=P7 & P6 & P5 &!P4 &!P3;
!0E29=P7 & P6 & P5 &!P4 & P3;
!0E30=P7 & P6 & P5 & P4 &!P3;
!0E31=P7 & P6 & P5 & P4 & P3;

In the latter regard, by way of example, !0E0 controls the output of 8 bit multiplexer quick switches 53–54 illustrated in FIG. 5 because !0E0 becomes '0' when output ports P7 to P3 of said remote 8 bit I/O expander 50 are all '0'.

Figure 6:
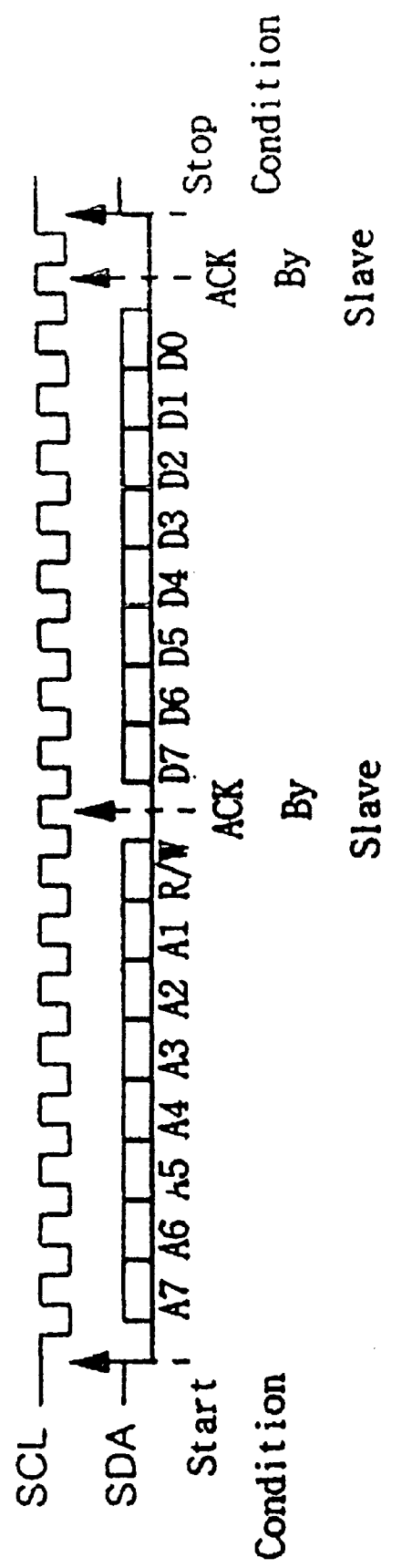
FIG. 6 illustrates a timing diagram showing basic protocol in a I2C bus write operation.

FIG. 6 illustrates a timing diagram showing the basic protocol for a I2C bus write operation.

In FIG. 6, if the I2C bus master device changes the SDA signal from high to low with a high SCL signal in order to write to an I2C bus slave device through the I2C bus, the start condition of the I2C bus occurs, and it drives 8 bits of the address of the I2C bus slave device in service wherein it communicates.

The I2C bus slave device appointed by the address informs the I2C bus master device of no problem by setting the SDA signal to low at the next clock of the last address bit (ACK operation). The I2C bus master device receives the ACK signal and operates on the 8 bits of data to write them in serial fashion onto the I2C bus according to the SCL signal, and the I2C bus slave device receives and saves the data.

The I2C bus slave device sends an ACK signal by setting the SDA signal to low when the data are received safely.

The I2C bus master device, having received the ACK signal, finishes the bus operation by changing the SDA signal from low to high, while the SCL signal is high.

Figure 7:
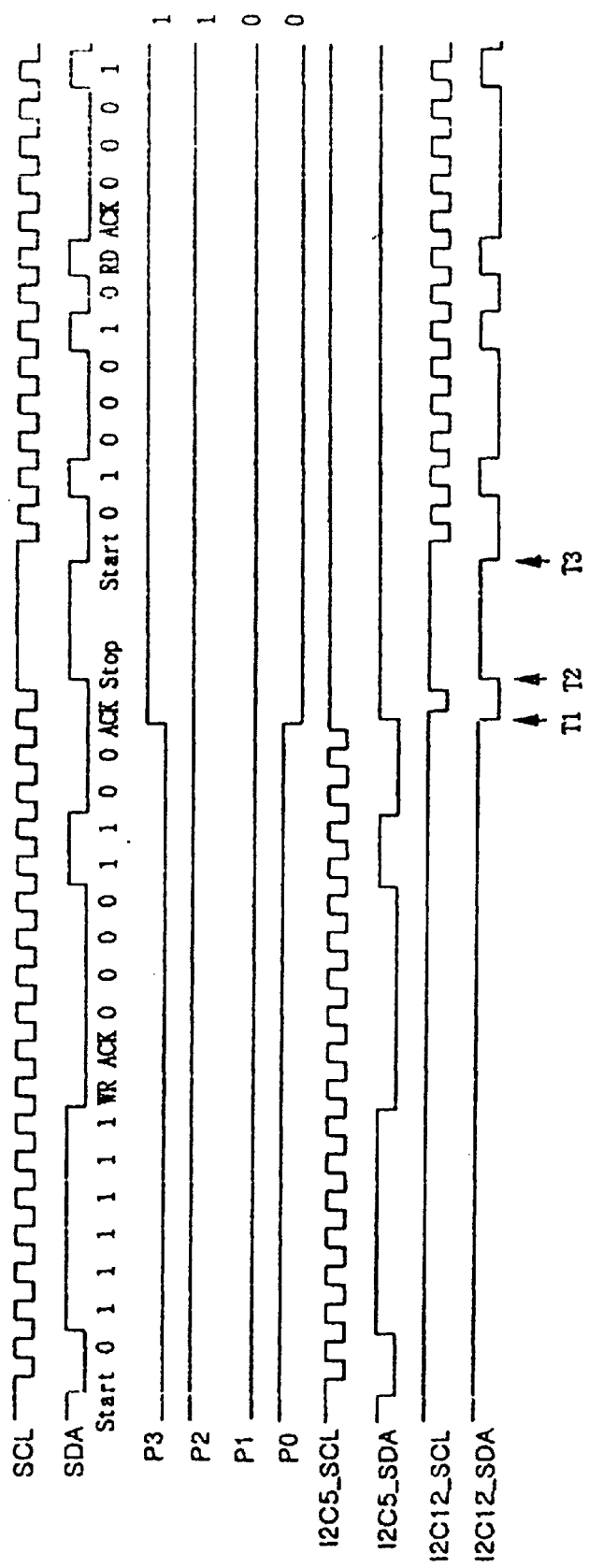
FIG. 7 illustrates a timing diagram of a primary I2C bus signal, a secondary I2C bus signal and other signals according to the secondary I2C bus change.

FIG. 7 illustrates a timing diagram of a primary I2C bus signal, a secondary I2C bus signal, and other signals, while said master device 40 illustrated in FIG. 5 changes from the secondary I2C bus number 5 to secondary I2C bus number 12. In FIG. 7, output ports P3 to P0 of remote 8 bit I/O expander 50 change at time T with the rising edge of the SCL signal at the time of an ACK operation, and the secondary I2C bus connected to the primary I2C bus at the time T1 changes from number 5 to number 12.

In the timing diagram for number 12 of the secondary I2C bus, at time T, a start condition occurs and, at time T2, an end condition occurs. A dummy operation of a perfect cycle is made, but it does not affect the operation of I2C bus slave device because the cycle terminates normally.

The I2C bus slave device having address '0100010X' on secondary bus number 12 responds to a start condition at T3.

In accordance with the present invention as described above, it is possible to embody a diagnostic/control system with various perfect functions by dividing the primary I2C bus into a maximum of 256 secondary I2C buses, and by making it possible to connect to as many I2C bus slave devices as can be connected to a I2C bus master device.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A diagnostic/control system using a multi-level I2C bus, comprising:

multiple I2C bus master devices connected to a primary I2C bus;

multiple I2C bus slave devices connected to respective secondary I2C buses; and an I2C bus multiplexer module which connects each of said secondary I2C buses to said primary I2C bus;

wherein each of said secondary I2C buses has a respective plurality of said multiple I2C bus slave devices connected thereto, and wherein each of said I2C bus slave devices can be accessed by said I2C bus master devices at any instant by operation of said I2C bus multiplexer module.

2. A diagnostic/control system using a multi-level I2C bus as set forth in claim 1, said I2C bus multiplexer module comprising:

a remote 8 bit I/O expander which changes bus serial data of said primary I2C bus into parallel data by connecting to said primary I2C bus;

a register denoting an I2C bus slave device address of the remote 8 bit I/O expander;

registers transmitting high current to said primary I2C bus;

8 bit multiplexer quick switches for multiplexing an SCL signal and an SDA signal of said primary I2C bus into each secondary I2C bus by using three bits of outputs of said remote 8 bit I/O expander as select input signals, and by using an additional bit of outputs of said remote 8 bit I/O expander as an output enable signal;

an inverter for driving the output enable signal of the 8 bit multiplexer quick-switches in order to distinguish an upper block from a lower block of said secondary I2C bus by inverting the additional bit of said outputs of the remote 8 bit I/O expander; and a pull-up resistive network for transmitting high current toward each of said secondary I2C buses.

3. A diagnostic/control system using a multi-level I2C bus as set forth in claim 2, wherein a given I2C bus master device takes charge of a given I2C bus slave device so as to permit access on said secondary I2C bus among said multiple I2C bus master devices, communicates with the remote 8 bit I/O expander, and sets output ports of the remote 8 bit I/O expander at a value suitable for a desired secondary I2C bus number; and wherein the given I2C bus master device has an input port and controls select input ports of said 8 bit multiplexer quick switches, and said given I2C bus master device connects an output port of each said 8 bit multiplexer quick switch with its own input port, and communicates with an arbitrary I2C bus slave device on an arbitrary secondary I2C bus slave device bus by selectively enabling and disabling the output port of each said 8 bit multiplexer quick switch with an OE input port value through said inverter according to an output of the remote 8 bit I/O expander.

4. A diagnostic/control system using a multi-level I2C bus as set forth in claim 3, wherein the given I2C bus master device taking charge of the given I2C bus slave device communicates with any of said I2C bus slave devices on any of said secondary I2C buses by setting a value suitable to the desired secondary I2C bus number in accordance with the output ports of the remote 8 bit I/O expander whenever any change of any secondary I2C bus is needed.

5. A diagnostic/control system using a multi-level I2C bus as set forth in claim 2, wherein said secondary I2C buses generate 32 output enable signals of said 8 bit multiplexer quick switches using 5 bits of the output port of said remote 8 bit I/O expander for the I2C bus, and wherein said secondary I2C buses are 256 in number at a maximum by controlling each of said 8 bit multiplexer quick switches in accordance with an output enable signal.

6. A diagnostic/control system using a multi-level I2C bus as set forth in claim 5, wherein the 32 output enable signals of said 8 bit multiplexer quick switches are generated by a generation circuit having an equivalent function with said inverter in accordance with a Boolean expression as follows:

!0E0=!P7 &!P6 &!P5 &!P4 &!P3;
!0E1=!P7 & !P6 & !P5 & !P4 & P3;
!0E2=!P7 & !P6 & !P5 & P4 & !P3;
!0E3=!P7 & !P6 &!P5 & P4 & P3;
!0E4=!P7 &!P6 & P5 &!P4 &!P3;
!0E5=!P7 &!P6 & P5 &!P4 & P3;
!0E6=!P7 &!P6 & P5 & P4 &!P3;
!0E7=!P7 &!P6 & P5 & P4 & P3;
!0E8=!P7 & P6 &!P5 &!P4 &!P3;
!0E9=!P7 & P6 &!P5 &!P4 & P3;
!0E10=!P7 & P6 &!P5 & P4 &!P3;
!0E11=!P7 & P6 &!P5 & P4 & P3;
!0E12=!P7 & P6 & P5 &!P4 &!P3;
!0E13=!P7 & P6 & P5 &!P4 & P3;
!0E14=!P7 & P6 & P5 & P4 &!P3;
!0E15=!P7 & P6 & P5 & P4 & P3;
!0E16=P7 & !P6 & !P5 & !P4 & !P3;
!0E17=P7 &!P6 &!P5 &!P4 & P3;
!0E18=P7 &!P6 &!P5 & P4 &!P3;
!0E19=P7 &!P6 &!P5 & P4 & P3;
!0E20=P7 & !P6 & P5 & !P4 & !P3;
!0E21=P7 &!P6 & P5 &!P4 & P3;
!0E22=P7 &!P6 & P5 & P4 &!P3;
!0E23=P7 &!P6 & P5 & P4 & P3;
!0E24=P7 & P6 & !P5 & !P4 & !P3;
!0E25=P7 & P6 &!P5 &!P4 & P3;
!0E26=P7 & P6 &!P5 & P4 &!P3;
!0E27=P7 & P6 &!P5 & P4 & P3;
!0E28=P7 & P6 & P5 &!P4 &!P3;
!0E29=P7 & P6 & P5 &!P4 & P3;
!0E30=P7 & P6 & P5 & P4 &!P3;
!0E31=P7 & P6 & P5 & P4 & P3;

and wherein P is the output port of said 8 bit remote I/O expander and !0E0 to !0E31 are the generated output enable signals.

7. A diagnostic/control system using a multi-level I2C bus as set forth in claim 1, wherein said I2C bus multiplexer module comprises a remote 8 bit I/O expander, and wherein a given I2C bus master device takes charge of a given I2C bus slave device so as to permit access on said secondary I2C buses among said multiple I2C bus master devices, communicates with the remote 8 bit I/O expander, and sets output ports of the remote 8 bit I/O expander at a value suitable for a desired secondary I2C bus number; and wherein said given I2C bus master device has an input port and controls select input ports of said 8 bit multiplexer quick switches, and said given I2C bus master device connects an output port of each of said 8 bit multiplexer quick switches with its own input port, and communicates with an arbitrary I2C bus slave device on an arbitrary secondary I2C bus slave device bus by selectively enabling and disabling an output port of each of said 8 bit multiplexer quick switches with an OE input port value through an inverter according to an output of the remote 8 bit I/O expander.

8. A diagnostic/control system using a multi-level I2C as set forth in claim 1, wherein said I2C bus multiplexer module comprises a remote 8 bit I/O expander and 8 bit multiplexer quiet switches for multiplexing an SCL signal and an SDA signal of said primary I2C bus into each secondary bus, and wherein said secondary I2C buses generate 32 output enable signals of said 8 bit multiplexer quick switches using 5 bits of an output port of said remote 8 bit I/O expander, and wherein said secondary I2C buses are 256 in number at a maximum by controlling each of said 8 bit multiplexer quick switches in accordance with an output enable signal.

9. A diagnostic/control system, comprising:

multiple bus master devices connected to a primary bus;
multiple bus slave devices connected to a plurality of secondary buses; and
a bus multiplexer connected to said primary bus and to each of said secondary buses for providing access between any one of said bus master devices and any one of said bus slave devices;
wherein each of said secondary buses has a respective plurality of said multiple bus slave devices connected thereto.

10. The diagnostic/control system of claim 9, wherein said bus multiplexer comprises an input/output expander for changing bus serial data from said primary bus to parallel data for provision to said secondary buses.

11. The diagnostic/control system of claim 10, wherein said bus multiplexer further comprises a register for designating a bus slave device address of the input/output expander.

12. The diagnostic/control system of claim 10, wherein said bus multiplexer comprises at least one register for transmitting a high level current to said primary bus.

13. The diagnostic/control system of claim 12, wherein said at least one register comprises a pair of registers.

14. The diagnostic/control system of claim 10, wherein said bus multiplexer comprises a plurality of switches for multiplexing at least one signal from said primary bus into said secondary buses using a multi-bit output of said input/output expander as an input selection signal, and by using at least one bit output of said input/output expander as an output enable signal.

15. The diagnostic/control system of claim 14, wherein said bus multiplexer further comprises an inverter for inverting said at least one bit output of said input/output expander in order to provide said output enable signal.

16. The diagnostic/control system of claim 10, wherein a given one of said bus master devices takes charge of a given one of said bus slave devices so as to permit access on a desired one of said secondary buses, said given one of said bus master devices communicating with said bus multiplexer and setting an output port of said bus multiplexer at a value corresponding to said desired one of said secondary buses.

17. The diagnostic/control system of claim 10, wherein a given one of said bus master devices controls select input ports of said bus multiplexer, connects each of a plurality of output ports of said bus multiplexer with an input port of said given one of said bus master devices, and communicates with a given one of said bus slave devices on a corresponding one of said secondary buses by selectively enabling and disabling said output port of said bus multiplexer.

18. The diagnostic/control system of claim 10, wherein said bus multiplexer further comprises a plurality of multiplexer quick switches connected to said input/output expander, said plurality of secondary buses generating output enable signals of said multiplexer quick switches using a plurality of bits of an output port of said input/output expander, each of said multiplexer quick switches being controlled in accordance with an output enable signal.

19. A diagnostic/control system, comprising:
a plurality of bus master devices connected to a primary bus;
a plurality of bus slave devices connected to a plurality of secondary buses; and
multiplexer means connected to said primary bus and to said secondary buses for providing access between any one of said bus master devices and any one of said bus slave devices;
wherein said multiplexer means comprises an input/output expander for changing bus serial data from said primary bus to parallel data for provision to said secondary buses.

20. The diagnostic/control system of claim 19, wherein said multiplexer means further comprises a register for designating a bus slave device address of the input/output expander.

21. The diagnostic/control system of claim 19, wherein said multiplexer means comprises at least one register for transmitting a high level current to said primary bus.

22. The diagnostic/control system of claim 21, wherein said at least one register comprises a pair of registers.

23. The diagnostic/control system of claim 19, wherein said multiplexer means comprises a plurality of switches for multiplexing at least one signal from said primary bus into said secondary buses using a multi-bit output of said input/output expander as an input selection signal, and by using at least one bit output of said input/output expander as an output enable signal.

24. The diagnostic/control system of claim 23, wherein said multiplexer means further comprises an inverter for inverting said at lease one bit output of said input/output expander in order to provide said output enable signal.

25. The diagnostic/control system of claim 19, wherein a given one of said plurality of bus master devices takes charge of a given one of said bus slave devices so as to permit access on a desired one of said secondary buses, said given one of said plurality of bus master devices communicating with said multiplexer means and setting an output port of said multiplexer means at a value corresponding to said desired one of said secondary buses.

26. The diagnostic/control system of claim 19, wherein a given one of said bus master devices controls select input ports of said multiplexer means, connects each of a plurality of output ports of said multiplexer means with an input port of said given one of said bus master devices, and communicates with said given one of said bus slave devices on a given one of said secondary buses by selectively enabling and disabling said output port of said multiplexer means in accordance with an output of said multiplexer means.

27. The diagnostic/control system of claim 19, wherein said multiplexer means comprises a plurality of multiplexer quick switches connected to said input/output expander, said plurality of secondary buses generating output enable signals of said multiplexer quick switches using a plurality of bits of an output port of said input/output expander, said secondary buses being expanded into a plurality of buses by controlling each of said multiplexer quick switches in accordance with an output enable signal.

28. A diagnostic/control system, comprising:
a plurality of bus master devices connected to a primary bus;
a plurality of bus slave devices connected to at least one secondary bus; and
multiplexer means connected to said primary bus and to said at least one secondary bus for providing access between any one of said bus master devices and any one of said bus slave devices;
wherein said multiplexer means comprises a remote input/output expander for changing bus serial data from said primary bus to parallel data for provision to said at least one secondary bus, and wherein said multiplexer means further comprises a plurality of switches for multiplexing at least one signal from said primary bus into said at least one secondary bus using a multi-bit output of said remote input/output expander as an input selection signal, and by using at least one bit output of said remote input/output expander as an output enable signal.

29. The diagnostic/control system of claim 28, wherein said at least one secondary bus comprises a plurality of secondary buses.

30. The diagnostic/control system of claim 28, wherein said multiplexer means further comprises a register for designating a bus slave device address of the remote input/output expander.

31. The diagnostic/control system of claim 28, wherein said multiplexer means comprises at least one register for transmitting a high level current to said primary bus.

32. The diagnostic/control system of claim 31, wherein said at least one register comprises a pair of registers.

33. The diagnostic/control system of claim 28, wherein said multiplexer means further comprises an inverter for inverting said at least one bit output of said remote input/ output expander in order to provide said output enable signal.

34. The diagnostic/control system of claim 28, wherein a given one of said plurality of bus master devices takes charge of a given one of said bus slave devices so as to permit access on said at least one secondary bus, said given one of said plurality of bus master devices communicating with said multiplexer means and setting an output port of said multiplexer means at a value corresponding to a desired secondary bus.

35. The diagnostic/control system of claim 28, wherein a given one of said plurality of bus master devices controls select input ports of said multiplexer means, connects each of a plurality of output ports of said multiplexer means with an input port of said given one of said plurality of bus master devices, and communicates with a given one of said bus slave devices on said at least one secondary bus by selectively enabling and disabling said output port of said multiplexer means.

36. The diagnostic/control system of claim 28, wherein said at least one secondary bus generates output enable signals of said multiplexer quick switches using a plurality of bits of an output port of said remote input/output expander, said at least one secondary bus being expanded into a plurality of buses by controlling each of said multiplexer quick switches in accordance with an output enable signal.

37. A diagnostic/control system using a multi-level I2C bus, comprising:
  multiple I2C bus master devices connected to a primary I2C bus;
  multiple I2C bus slave devices connected to respective secondary I2C buses; and
  an I2C bus multiplexer module which connects each of said secondary I2C buses to said primary I2C bus;
  wherein each of said I2C bus slave devices can be accessed by said I2C bus master devices at any instant by operation of said I2C bus multiplexer module;
  said I2C bus multiplexer module comprising:
    a remote 8 bit I/O expander which changes bus serial data of said primary I2C bus into parallel data by connecting to said primary I2C bus;
    a register denoting an I2C bus slave device address of the remote 8 bit I/O expander;
    registers transmitting high current to said primary I2C bus;
    8 bit multiplexer quick switches for multiplexing an SCL signal and an SDA signal of said primary I2C bus into each secondary I2C bus by using three bits of outputs of said remote 8 bit I/O expander as select input signals and by using an additional bit of outputs of said remote 8 bit I/O expander as an output enable signal;
    an inverter for driving the output enable signal of the 8 bit multiplexer quick switches in order to distinguish an upper block from a lower block of said secondary I2C bus by inverting the additional bit of said outputs of the remote 8 bit I/O expander; and
    a pull-up resistive network for transmitting high current toward each of said secondary I2C buses.

38. A diagnostic/control system using a multi-level I2C bus as set forth in claim 37, wherein a given I2C bus master device takes charge of a given I2C bus slave device so as to permit access on said secondary I2C bus among said multiple I2C bus master devices, communicates with the remote 8 bit I/O expander, and sets the output ports of the remote 8 bit I/O expander at a value suitable for a desired secondary I2C bus number; and
  wherein the given I2C bus master device has an input port and controls select input ports of said 8 bit multiplexer quick switches, and said given I2C bus master device connects an output port of each of said 8 bit multiplexer quick switches with its own input port, and communicates with an arbitrary I2C bus slave device on an arbitrary secondary I2C bus slave device bus by selectively enabling and disabling the output port of each said 8 bit multiplexer quick switch with an OE input port value through said inverter according to an output of the remote 8 bit I/O expander.

39. A diagnostic/control system using a multi-level I2C bus as set forth in claim 38, wherein the given I2C bus master device taking charge of the given I2C bus slave device as to permit access on the secondary I2C bus of said multiple I2C bus master devices communicates with any of said I2C bus slave devices on any of said secondary I2C buses by setting a value suitable to the desired secondary I2C bus number in accordance with the output ports of the remote 8 bit I/O expander whenever any change of any secondary I2C bus is needed.

40. A diagnostic/control system using a multi-level I2C bus as set forth in claim 37, wherein said multiple secondary I2C buses generate 32 output enable signals of said 8 bit multiplexer quick switches using 5 bits of the output port of said remote 8 bit I/O expander, and wherein said multiple secondary I2C buses are 256 in number at a maximum by controlling each said 8 bit multiplexer quick switch in accordance with an output enable signal.

41. A diagnostic/control system using a multi-level I2C bus as set forth in claim 40, wherein the 32 output enable signals of said 8 bit multiplexer quick switches are generated by a generation circuit having an equivalent function with said inverter in accordance with a Boolean expression as follows:

!OE0=!P7 &!P6 &!P5 &!P4 &!P3;
!OE1=!P7 & !P6 & !P5 & !P4 & P3;
!OE2=!P7 & !P6 & !P5 & P4 & !P3;
!OE3=!P7 & !P6 &!P5 & P4 & P3;
!OE4=!P7 &!P6 & P5 &!P4 &!P3;
!OE5=!P7 &!P6 & P5 &!P4 & P3;
!OE6=!P7 &!P6 & P5 & P4 &!P3;
!OE7=!P7 &!P6 & P5 & P4 & P3;
!OE8=!P7 & P6 &!P5 &!P4 &!P3;
!OE9=!P7 & P6 &!P5 &!P4 & P3;
!OE10=!P7 & P6 &!P5 & P4 &!P3;
!OE11=!P7 & P6 &!P5 & P4 & P3;
!OE12=!P7 & P6 & P5 &!P4 &!P3;
!OE13=!P7 & P6 & P5 &!P4 & P3;
!OE14=!P7 & P6 & P5 & P4 &!P3;
!OE15=!P7 & P6 & P5 & P4 & P3;
!OE16=P7 & !P6 & !P5 & !P4 & !P3;
!OE17=P7 &!P6 &!P5 &!P4 & P3;
!OE18=P7 &!P6 &!P5 & P4 &!P3;
!OE19=P7 &!P6 &!P5 & P4 & P3;
!OE20=P7 & !P6 & P5 & !P4 & !P3;
!OE21=P7 &!P6 & P5 &!P4 & P3;

!0E22=P7 &!P6 & P5 & P4 &!P3;
!0E23=P7 &!P6 & P5 & P4 & P3;
!0E24=P7 & P6 & !P5 & !P4 & !P3;
!0E25=P7 & P6 &!P5 &!P4 & P3;
!0E26=P7 & P6 &!P5 & P4 &!P3;
!0E27=P7 & P6 &!P5 & P4 & P3;
!0E28=P7 & P6 & P5 &!P4 &!P3;
!0E29=P7 & P6 & P5 &!P4 & P3;
!0E30=P7 & P6 & P5 & P4 &!P3;
!0E31=P7 & P6 & P5 & P4 & P3;

and wherein P is the output port of said 8 bit remote I/O expander and !0E0 to !0E31 are the generated output enable signals.

* * * * *